April 22, 1969   F. F. HOLUB   3,440,215
AROMATIC POLYIMIDES
Filed March 17, 1965
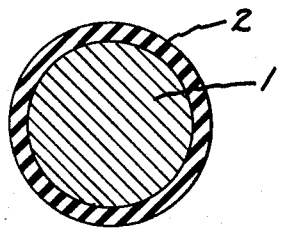
Inventor:
Fred F. Holub,
by Joseph T. Cohen
His Attorney.

United States Patent Office 3,440,215
Patented Apr. 22, 1969

3,440,215
AROMATIC POLYIMIDES
Fred F. Holub, Scotia, N.Y., assignor to General Electric Company, a corporation of New York
Filed Mar. 17, 1965, Ser. No. 440,387
Int. Cl. H01b 3/30; C08g 20/32, 23/20
U.S. Cl. 260—47                          5 Claims

ABSTRACT OF THE DISCLOSURE

An aryl dianhydride is produced by the reaction of 4-chloroformyl phthalic anhydride and N,N'-diphenyl-p-phenylene-diamine. This dianhydride is converted to novel aromatic polyimides by reacting the dianhydride with arylene diamines. The novel aryl dianhydride is useful as a curing agent for epoxy resins and as an intermediate in the production of polyimide resins. The aromatic polyimides produced by this invention are useful as insulating coatings for electrical conductors.

---

This invention relates to aryl dianhydrides and polymeric compositions prepared therefrom. More particularly the invention relates to a completely aromatic N-phenyl dianhydride and to completely aromatic N-phenyl-amide-imide polymers prepared therefrom having high melting points, exceptional resistance to heat and a high degree of solubility in organic solvents.

In a more specific aspect, this invention relates to a completely aromatic dianhydride prepared by the reaction of N,N'-diphenyl-p-phenylenediamine with 4-chloroformyl phthalic anhydride and to the completely aromatic N-phenylamide-imide polymers prepared by reaction of the anhydride with arylene diamines.

The dianhydride of the present invention corresponds to the formula

I
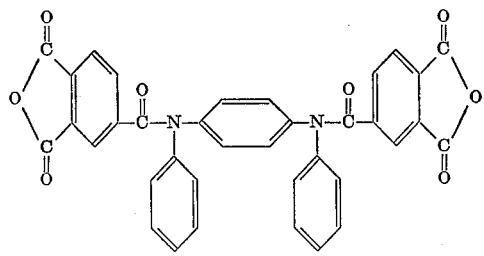

and can be prepared by the following reaction which is intended for the purposes of illustration only

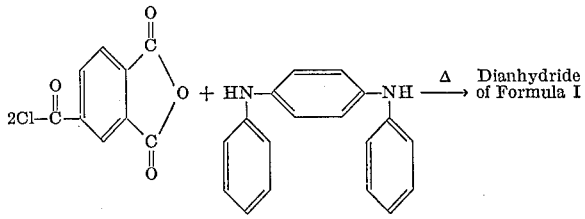

The polymers to which this invention is directed may be represented as being composed of recurring units of the formula II
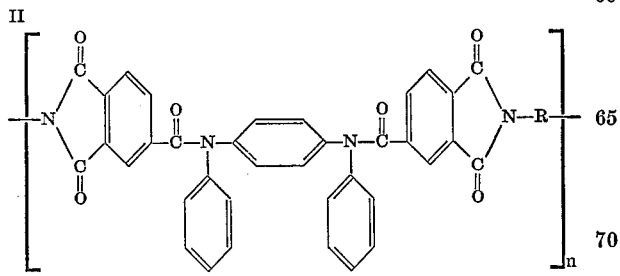

where R is a radical selected from the group consisting of

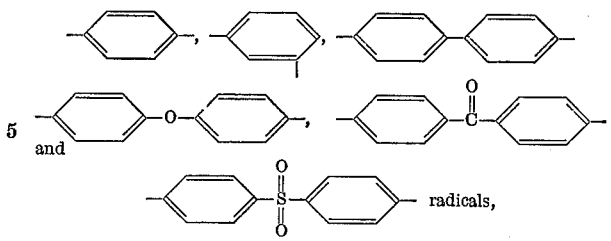

and $n$ is a whole number in excess of 10 up to about 10,000 or more, and advantageously from 100 to 5,000. The molecular weights of the polymers may range from about 5,000 to 2,000,000 or more when measured by usual methods, for example, by light scattering.

In the designation of the novel polymers of this invention reference has been made to the polymers as being completely aromatic. More precisely, it is intended to define by this language polymers which have no hydrogen bonded to nitrogen but wherein all hydrogen is included only in an aromatic ring. The presence of the phenyl groups on the nitrogen atoms in place of hydrogen thereon results in several materially unexpected advantages. In the first place, the polymers are soluble in a larger number of solvents and particularly in the more common solvents used in making wire enamels, such as cresol, xylenol, cresylic acid mixtures, etc. Moreover, these polymers have lower melting points than the corresponding polymers in which nitrogen is substituted with hydrogen; this enables these compositions to be molded in the usual molding apparatus subject only to the condition that somewhat higher molding temperatures are employed. Thus, the polymers of this invention have softening points in the neighborhood of from 275° to around 375° C. in contrast to melting points in excess of around 400° C. or higher for polymers correspondingly the same except that they have nitrogen-bonded hydrogen instead of phenyl groups. Finally, the presence of phenyl groups on the nitrogen atom improves markedly the oxidative resistance of the polymers to elevated temperatures with essentially little change in color being encountered even after heat aging polymers of this type for many hours at temperatures of 250° to around 300° C.

The phenylene diamines (hereinafter referred to as "diamines") which may be successfully employed in preparing the polymers herein described may include para-phenylenediamine, meta-phenylene diamine, para-biphenylene diamine, etc. Also included within the scope of the diamines useful in this invention are diamines of the structure:

(III)   $H_2N\text{—}\bigcirc\text{—R—}\bigcirc\text{—}NH_2$ where R has the meanings given above. The valences of R are preferably meta and para to the nitrogens. Among such diamines of Formula III may be mentioned, for instance, p,p'-oxydianiline, benzidine, 3,3'-diamino-biphenyl, diamines having the formulas

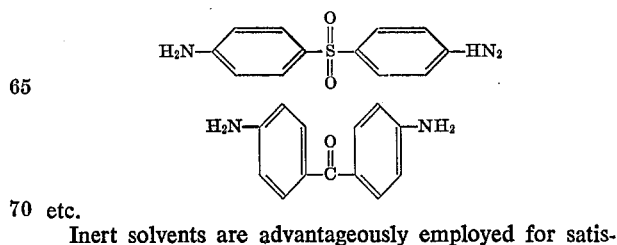

etc.
Inert solvents are advantageously employed for satisfactory preparation of the anhydride and suitable and representative solvents include trichlorobiphenyl, tetrachlorethane, monochlorobiphenyl, dichlorobiphenyl, biphenyl, trichlorobenzene, diphenyl ether, and other high boiling (above 125° C.) aromatic or aliphatic solvents.

The reaction of the dianhydride of Formula I and the diamine to produce the polymers may be carried out in various solvents such as dimethylacetamide; N-methyl-2-pyrrolidone, cresol, etc., to produce poly N-arylamide-imides. The initial reaction is the formation of a soluble N-phenylamide acid of the formula

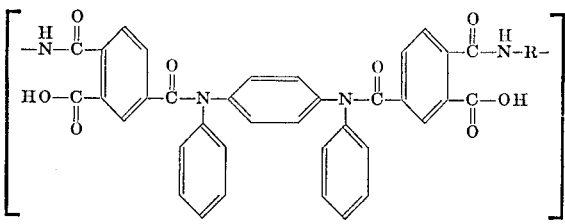

where R and n having the meanings above, which, on subsequent or continued heating, proceeds to form the polyimide.

The dianhydride is readily soluble and may be mixed with various other dianhydrides, such as pyromellitic dianhydride, benzophenonetetracarboxylic dianhydride, the dianhydride of 1,2,3,4-cyclopentane-tetracarboxylic acid, etc., and then reacted with the diamine or mixture of diamines in order to achieve solubility of the copolymers in the various solvents listed above.

While preparation of the dianhydride and the polymers have been shown as separate reactions, it is also possible to prepare the polymers in situ without isolating the intermediate anhydride of Formula I. Thus, the polymers may be prepared directly by reacting N,N'-diphenyl-p-phenylene diamine with chloroformyl phthalic anhydride and then adding a second diamine required to make the polymers in a suitable solvent.

With respect to the polymers of this invention, and without intending to be limited by any theory, the high degree of stability, particularly heat stability, is believed to be derived from the absence of hydrogen atoms bonded to any nitrogen atom in the molecular chain. The structure of this polymer is confirmed in conventional manner as by infrared spectrum analysis.

In the preparation of the dianhydride and subsequently the polymers, various proportions of each component of the reaction involved may be employed. Thus, in the preparation of the dianhydride, I may use for each mol of the N,N'-diphenyl-p-phenylene diamine, from 2 to 6 mols of 4-chloroformyl phthalic anhydride. In the preparation of the polymers, I may use essentially equimolar concentrations of ingredients but molar proportions of from 0.95 to 1.05 mols of the dianhydride of Formula I per mol of the diamine are not precluded.

In order that those skilled in the art may better understand how the present invention may be practiced, the following examples are given by way of illustration and not by way of limitation:

Example 1

A mixture of 13.0 g. N,N'-diphenyl-p-phenylenediamine, 32.2 g. of 4-chloroformyl phthalic anhydride and 50 ml. of trichlorobiphenyl was stirred and heated under nitrogen at 260° C. for 20 minutes. The product was washed with three 100 ml. portions of benzene, and dried to yield a product corresponding to Formula I, melting at 306–307° C. Analysis showed the compound to contain: C, 70.6%; H, 3.2%; N, 4.7%. Calculated values: C, 71.05%; H, 3.31%; N, 4.6%.

Example 2

To 12.04 g. the dianhydride prepared in Example 1 was added 50 g. of N-methyl pyrrolidone, the mixture was reacted for about five minutes, and then 4.32 g. of m-phenylenediamine was added and heated to about 50° C. for five minutes. The solution when cooled to room temperature was clear and viscous. When a sample of this polymer solution was placed on a glass slide and heated at 250° C. for 30 minutes, a polymer film was obtained which softened at about 300° C. and was hard and flexible. This polymer was composed of recurring units of the formula

IV

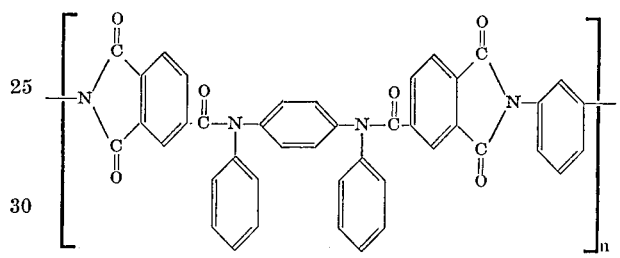

where n is a whole number in excess of 10.

Example 3

A mixture was prepared of 3.04 g. of the dianhydride of Example 1, 1.0 g. of p,p'-oxydianiline and 33 g. of dimethylacetamide. The mixture was stirred for 20 minutes at room temperature resulting in a viscous solution. A film was cast from this solution on a glass slide and heated for 25 minutes at 100–250° C. After removing from the glass, a flexible film was obtained. The polymer of this example softened around 300° C. and is composed of recurring units of the formula

V

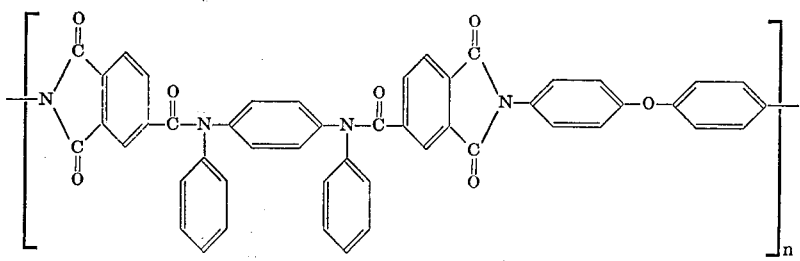

where n is a value in excess of 10.

A similar polymer was obtained when the above reactants were reacted in N-methyl-2-pyrrolidone as solvent instead of the dimethyl acetamide. The optimum properties were obtained when the cast film was heated gradually from 100–200° C. over 30 minutes. The polymer of Formula V can be dissolved in tetrachloroethane by slight warming to yield a clear coating solution which can be applied to electrical conductors. Nickel-coated copper conductors coated with this polymer were resistant to heat-shock after ½ hour at 250° C., were satisfactory on flexibility (1X bend) after 64 hours at 300° C. The cut-through temperature was 305–310° C.

Example 4

This example illustrates a method for making polymers of Formula II by an in situ reaction. More particularly, a mixture of 2.60 g. N,N'-diphenyl-p-phenylenediamine, 4.20 g. 4-chloroformyl phthalic anhydride and 12.0 g. of diphenyl ether was heated for 20 minutes at around 25–

240° C. On cooling, 30 ml. of dimethylacetamide and 2.0 g. p,p'-oxydianiline were added. A clear viscous solution was obtained. A portion of the solution was heated on a glass plate to 350° C., leaving a clear polymer film composed of units of the Formula V in Example 3.

Example 5

A mixture formed of 1.75 g. of the dianhydride of Example 1, 0.309 g. of p-phenylene diamine and 19.05 g. of N-methyl pyrrolidone is heated at about 50° C. for 20 minutes. When a film from this polymer solution is cast by heating and evaporating the solvent, a clear, transparent, flexible film is obtained. This polymer is composed of recurring units of the formula VI
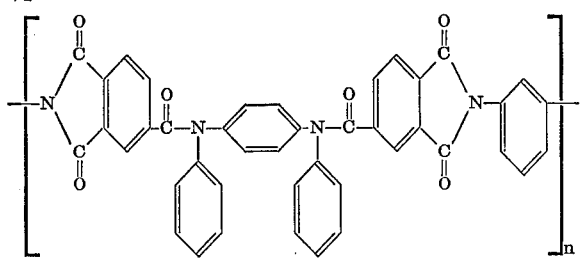

where $n$ is a whole number in excess of 10.

2,936,296. The polymer is composed of recurring units of the formula

VII
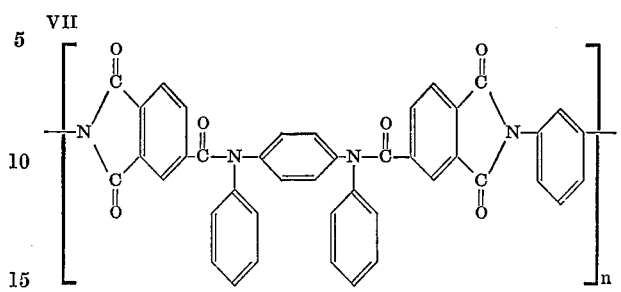

where $n$ is a whole number in excess of 10.

Example 7

A mixture of 1.52 g. of the dianhydride of Example 1, 0.46 g. of benzidine, and 17.82 g. of N-methyl-2-pyrrolidone is stirred and heated between 26–50° C. for 25 minutes to give a polymer solution from which a film can be cast on glass similarly as in the preceding examples. This film is strong and flexible and softens somewhat above 350° C. The polymer is composed of recurring units of the formula VIII
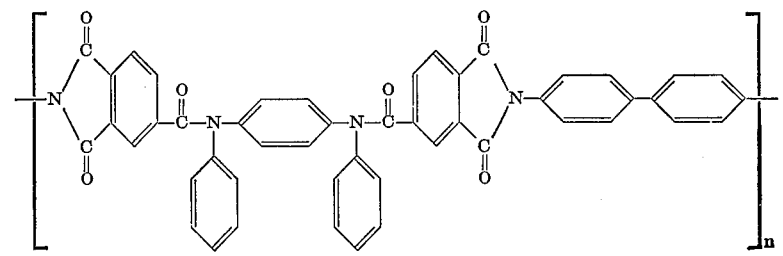

where $n$ is a whole number in excess of 10.

Example 6

To 1.8 g. of the dianhydride of Formula I is added 0.31 g. of m-phenylenediamine and 19 g. of N-methyl-2-pyrrolidone. The solution is heated between 26–50° C. for 15 minutes similarly as in Example 2 to give a solution of the polymer. A flexible film is obtained by casting a sample of the solution on a glass plate and evaporating the solvent by heating at 100–200° C. over a period of 1½ hours. This film has a cut-through temperature of 290° C. when measured in the manner described in U.S.

Example 8

A mixture of 1.52 g. of the dianhydride of Example 1, 0.62 g. of 4,4'-diaminodiphenyl sulfone and 18.18 g. of cresol are stirred and heated as follows: between 26° and 60° C. for 15 minutes and then cooled. A sample of the product cast on glass and the solvent evaporated at about 100–300° C. for 30 minutes, yields a transparent flexible film. The polymer is composed of recurring units of the formula IX
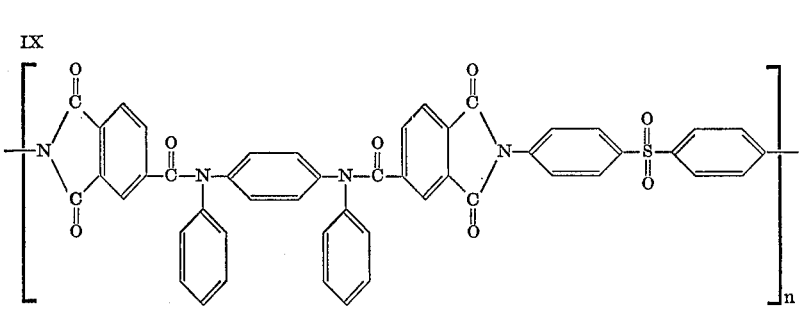

where $n$ is a whole number in excess of 10.

The polymers of this invention are conveniently suited as insulation for conductors. Thus, as illustrated in the accompanying drawing, where FIG. 1 is a cross-sectional view of a conductor comprising a conducting core 1 of copper, aluminum, copper alloy and the like, fabricated with insulation 2 comprising a polymeric product of this invention corresponding to Formula II.

To illustrate use of the present polymers as insulation for conductors, a nickel-coated copper wire was dipped into the polymer solution prepared as in Example 2 and cured at 300° C. for 3 minutes for each of the three coats. After cooling at room temperature, the wire was flexed and the coating thereon found to be satisfactory. The cut-through was determined to average around 290° C. When the film coating was heated on the nickel wire for 64 hours at 300° C., it was found to be still flexible.

The polymers of this invention are suitable for a wide variety of uses. To mention several, they may be used as laminating resins for glass cloth and metal, for high temperature coating materials, and as enamel compositions for insulation. More specifically, these polymers may be coated on metallic or non-metallic substrates by flame spraying, melt casting or by casting while dissolved in one of the solvents in which made or in other solvents in which they are soluble. The hot solution of the solvent may be forced through a spinneret into a heated drying tower, preferably maintained at reduced pressure, to form filaments or fibers, or the molten polymer may be forced through spinnerets by well known techniques to form filaments and fibers. The fibers so formed may be formed into yarns or used to form fiber matting. Alternatively, the polymer can be extruded through a die, or otherwise sheeted to form a continuous film. The compositions may also be extruded or applied from solution directly onto electrical conductors (or as an overcoating on insulated conductors), such as a wire, to form insulated electrical conductors. The compositions may also be injection, transfer or compression molded under heat and pressure to form intricately shaped objects of wide utility, dependent on the particular object molded. Other uses for films and the fabrics or mats made from the fibers include a wide variety of electrical applications, that is, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. The compositions may also be used to laminate or adhere glass and metal surfaces to themselves or to each other, or to other similar surfaces; for example, two glass surfaces may be laminated together by inserting an interlayer of the polymer either as a powder, as a film, or as a surface coating between two glass surfaces to be joined. Pressure or vacuum is applied to the assembly after it is heated to the softening point of the polymer to firmly adhere the two glass surfaces together. This process may be used for forming a vacuum-tight seal between two mating glass objects such as for making a cathode ray tube or other device.

Other valuable uses for the polymers of this invention will be readily apparent to those skilled in the art. Also, many apparently widely different embodiments such as the adding of pigments, fillers, stabilizers, plasticizers, etc., may be made to modify the properties of the polymers.

Various other polymers may be blended in solution with the polymers of the invention such as aromatic polyamide acids, polyimides, polybenzimidazoles, aromatic polyesters and other high temperature resins to yield mixed polymer blend compositions. Also, as previously indicated, various plasticizers such as polychlorobiphenyl, polyethers, polyesters, etc., may be employed for ease of fabrication.

It will be apparent to those skilled in the art that various modifying agents such as polymer chain terminators, which will increase the stability of the polymers of the instant invention can be added. Thus, one can incorporate, in amounts ranging from 1 to 5 mol percent, with the reactants used to make the wholly aromatic polymers of the present invention, compounds such as aniline, napthylamine, phthalic anhydride, etc. The addition of these chain terminators helps to control the molecular weight of the polymer.

In addition to the use of the aforesaid dianhydride as an intermediate in making polymers of the type described above, the dianhydride of Formula I can be used to effect curing of epoxy resins by incorporating small amounts of the dianhydride in an epoxy resin and heating the latter at temperatures of from 150–175° C. for times ranging from 10 minutes to 1 hour.

The dianhydride of the present invention (Formula I) differs from the dianhydrides described in the copending application of Donald F. Loncrini, Ser. No. 190,807, filed Apr. 27, 1962, now U.S.P. 3,182,073, and assigned to the same assignee as the present invention, in that my anhydride is completely free of nitrogen-bonded hydrogen. The polymers disclosed and claimed in the instant application (Formula II) differ from the polymers described in the application of Donald F. Loncrini, Ser. No. 320,556, filed Oct. 31, 1963, now U.S. Patent 3,355,427, and assigned to the same assignee as the present invention, in that again there are no nitrogens in the polymer which contain hydrogen thereon, but rather any free valence of nitrogen is satisfied only by a phenyl radical; the advantages of having nitrogen-bonded phenyl groups instead of nitrogen-bonded hydrogen in polymers are more particularly recited above.

What I claim as new and desire to secure by Letters Patent of the United States is:

1. A fusible, and heat stable polymer composed of recurring units of the formula

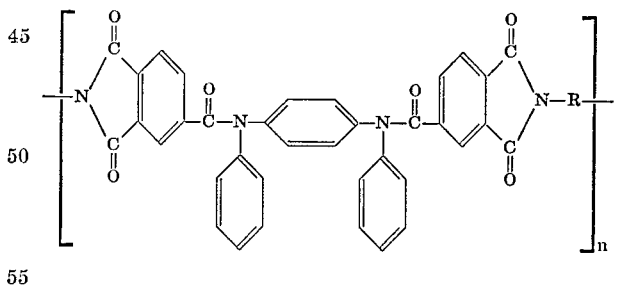

where R is a member selected from the class consisting of

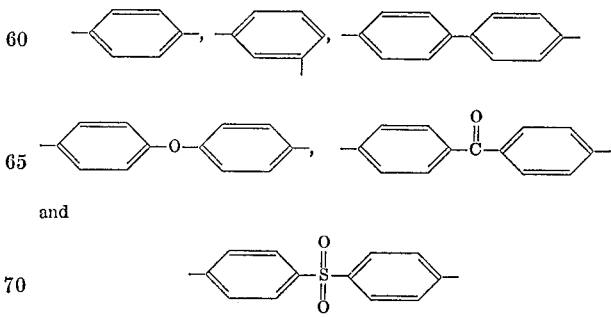

radicals, and $n$ is a whole number in excess of 10.

2. A fusible and heat stable polymer composed of recurring units of the formula

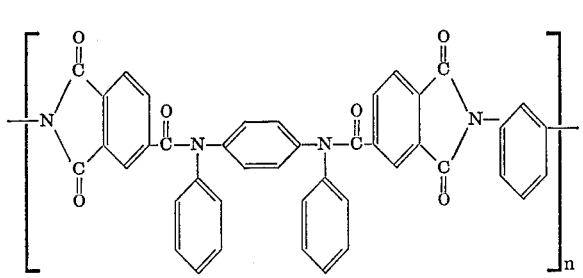

where *n* is a whole number in excess of 10.

3. A fusible and heat stable polymer composed of recurring units of the formula

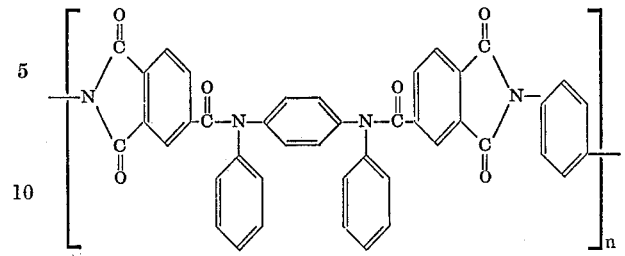

where *n* is a whole number in excess of 10.

4. A fusible and heat stable polymer composed of recurring units of the formula

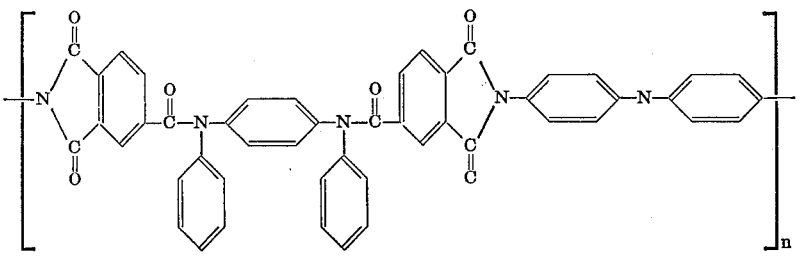

where *n* is a whole number in excess of 10.

5. A fusible and heat stable polymer composed of recurring units of the formula

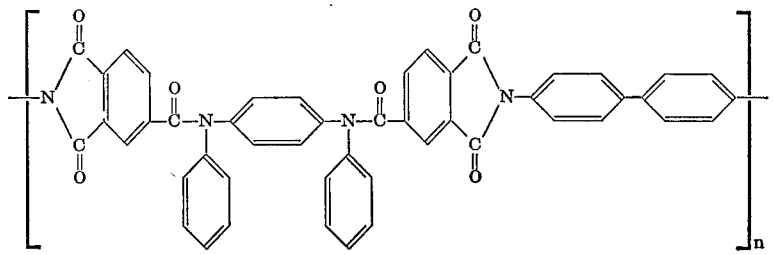

where *n* is a whole number in excess of 10.

References Cited

UNITED STATES PATENTS

| | | | |
|---|---|---|---|
| 3,296,201 | 1/1967 | Stephens | 260—78 |
| 3,355,427 | 11/1967 | Loncrini | 260—78 |
| 3,179,633 | 4/1965 | Endrey | 260—78 |
| 3,179,634 | 4/1965 | Edwards | 260—78 |
| 3,182,073 | 5/1965 | Loncrini | 260—78 |
| 3,296,201 | 1/1967 | Stephens | 260—78 |

HAROLD D. ANDERSON, *Primary Examiner.*

U.S. Cl. X.R.

117—161, 226; 161—227; 260—2, 30.2, 31.2, 32.6, 33.2, 33.4, 33.8, 47, 63, 78, 346.3, 33.8, 857

UNITED STATES PATENT OFFICE
CERTIFICATE OF CORRECTION

Patent No. 3,440,215     Dated April 22, 1969

Inventor(s) Fred F. Holub

It is certified that error appears in the above-identified patent and that said Letters Patent are hereby corrected as shown below:

Column 5, formula VI in Example 5, that portion of the formula reading:

"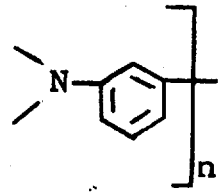"

should read

--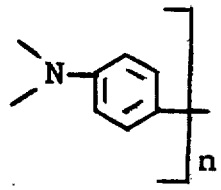--

Claim 4, line 3, that portion of the formula reading

"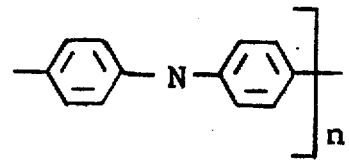"

should read

--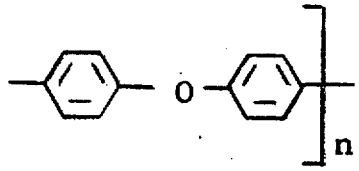--

SIGNED AND SEALED

JUN 23 1970

(SEAL)
Attest:

Edward M. Fletcher, Jr.
Attesting Officer